(12) United States Patent
Chen (10) Patent No.: US 10,643,053 B2
(45) Date of Patent: May 5, 2020

(54) METHOD AND CIRCUIT FOR FINGERPRINT DETECTION

(71) Applicant: Image Match Design Inc., Zhubei (TW)

(72) Inventor: Zhieng-Chung Chen, Hsinchu (TW)

(73) Assignee: IMAGE MATCH DESIGN INC., Zhubei, Hsinchu County (TW)

( * ) Notice: Subject to any disclaimer, the term of this patent is extended or adjusted under 35 U.S.C. 154(b) by 201 days.

(21) Appl. No.: 15/908,014

(22) Filed: Feb. 28, 2018

(65) Prior Publication Data

US 2018/0253582 A1 Sep. 6, 2018

(51) Int. Cl.
G06K 9/00 (2006.01)
G06K 9/46 (2006.01)
G06K 9/03 (2006.01)
G06K 9/26 (2006.01)

(52) U.S. Cl.
CPC .......... *G06K 9/0008* (2013.01); *G06K 9/001* (2013.01); *G06K 9/00013* (2013.01); *G06K 9/00114* (2013.01); *G06K 9/036* (2013.01); *G06K 9/26* (2013.01); *G06K 9/4604* (2013.01); *G06K 9/4642* (2013.01)

(58) Field of Classification Search
CPC ...... G06F 21/32; G06F 21/78; G06F 12/1416; G06F 21/316; G06K 19/07354; G06K 9/00013; G06K 9/0008; G06K 9/001; G07C 9/00087
USPC ............................................ 382/125; 341/33
See application file for complete search history.

(56) References Cited

U.S. PATENT DOCUMENTS 10,102,360 B2 * 10/2018 Mohan ..................... G06F 21/32
2016/0259448 A1 * 9/2016 Guarneri ............... G06F 3/0418

* cited by examiner

*Primary Examiner* — Charlotte M Baker
(74) *Attorney, Agent, or Firm* — Muncy, Geissler, Olds & Lowe, P.C.

(57) ABSTRACT

A method and circuit for fingerprint detection perform a first round of edge detection with a first parameter, and if a first value obtained during the first round of edge detection does not satisfy a predetermined threshold, perform a second round of edge detection with a second parameter, so as to allow a fingerprint that is not acceptable for the first parameter to be accepted for fingerprint recognition. If a second value obtained during the second round of edge detection does not satisfy the predetermined threshold neither, it is determined that the object subject to fingerprint detection is not a finger.

27 Claims, 7 Drawing Sheets

METHOD AND CIRCUIT FOR FINGERPRINT DETECTION

CROSS-REFERENCE TO RELATED APPLICATIONS

This application claims the priority benefit of Taiwan Application No. 106106695, filed 1 Mar. 2017, the contents of which in its entirety are herein incorporated by reference.

FIELD OF THE INVENTION

Generally, the present invention relates to fingerprint detection. Especially, the present invention relates to a method of fingerprint detection effective for all kinds of fingers.

BACKGROUND OF THE INVENTION

Fingerprint-based personal identification requires having a person to be identified to press his/her finger on a sensing circuit, obtaining a two-dimensional analog image of the finger, converting the two-dimensional analog image into a two-dimensional digital image datum, for example a two-dimensional pixel datum, and reading the whole two-dimensional digital image datum for comparison with stored datum for identification. However, after the sensing circuit obtains a two-dimensional analog image, it needs yet to identify in advance if the obtained two-dimensional analog image is exactly an image of a real finger's print, and the personal identification by using the obtained two-dimensional analog image is only executed after the obtained two-dimensional analog image is verified as a fingerprint image, so as to prevent mis-operation. For this purpose, the existing approaches usually use a preset standard parameter to verify a fingerprint's image. Although a standard parameter may effectively work for most people, there are still some people may fail to be identified under the same standard parameter due to various conditions, for example a very-dry finger or a finger not having enough clear fingerprint.

Therefore, it is needed alternative methodology of fingerprint detection effective for all kinds of fingers.

SUMMARY OF THE INVENTION

An objective of the present invention is to provide a method and circuit for fingerprint detection effective for all kinds of fingers.

Another objective of the present invention is to provide a method and circuit for fingerprint detection employing different parameters for two rounds of edge detection.

According to the present invention, after an object touch is detected, a first parameter is used to perform a first round of edge detection on an image datum output by a fingerprint image generator, to identify whether the detected object is a finger; when a first value obtained during the first round of edge detection does not satisfy a predetermined threshold, a second parameter is used to perform a second round of edge detection on the same image datum; and when a second value obtained during the second round of edge detection does not satisfy the predetermined threshold, the detected object is identified as not a finger.

According to the present invention, a circuit for fingerprint detection comprises a fingerprint image generator and a finger-detecting circuit. The finger-detecting circuit uses a first parameter to perform a first round of edge detection on an image datum output by the fingerprint image generator. When a first value obtained during the first round of edge detection does not satisfy a predetermined threshold, the finger-detecting circuit uses a second parameter to perform a second round of edge detection on the same image datum instead. When a second value obtained during the second round of edge detection does not satisfy the predetermined threshold, the finger-detecting circuit identifies the object as not a finger.

The disclosed method and circuit for fingerprint detection may use more suitable parameter for the second round of edge detection, so as to allow a fingerprint from a finger in special physical conditions to be acceptable for fingerprint recognition. Preferably, the second parameter is determined according to a figure generated by the first round of edge detection.

DETAILED DESCRIPTION OF THE INVENTION

Figure 1:
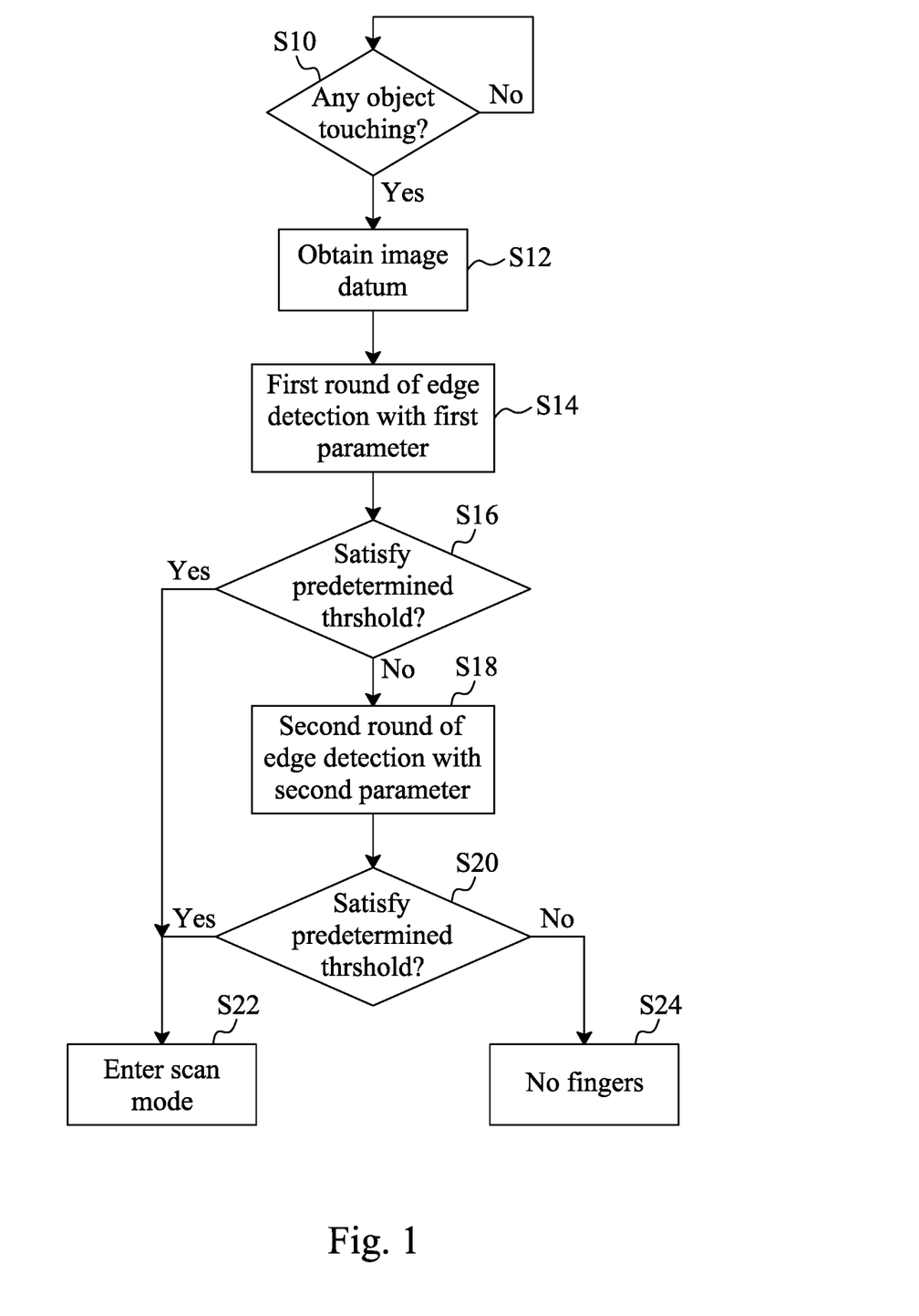
FIG. 1 is a flow chart of a method for fingerprint detection in a first embodiment according to the present invention.
Figure 2:
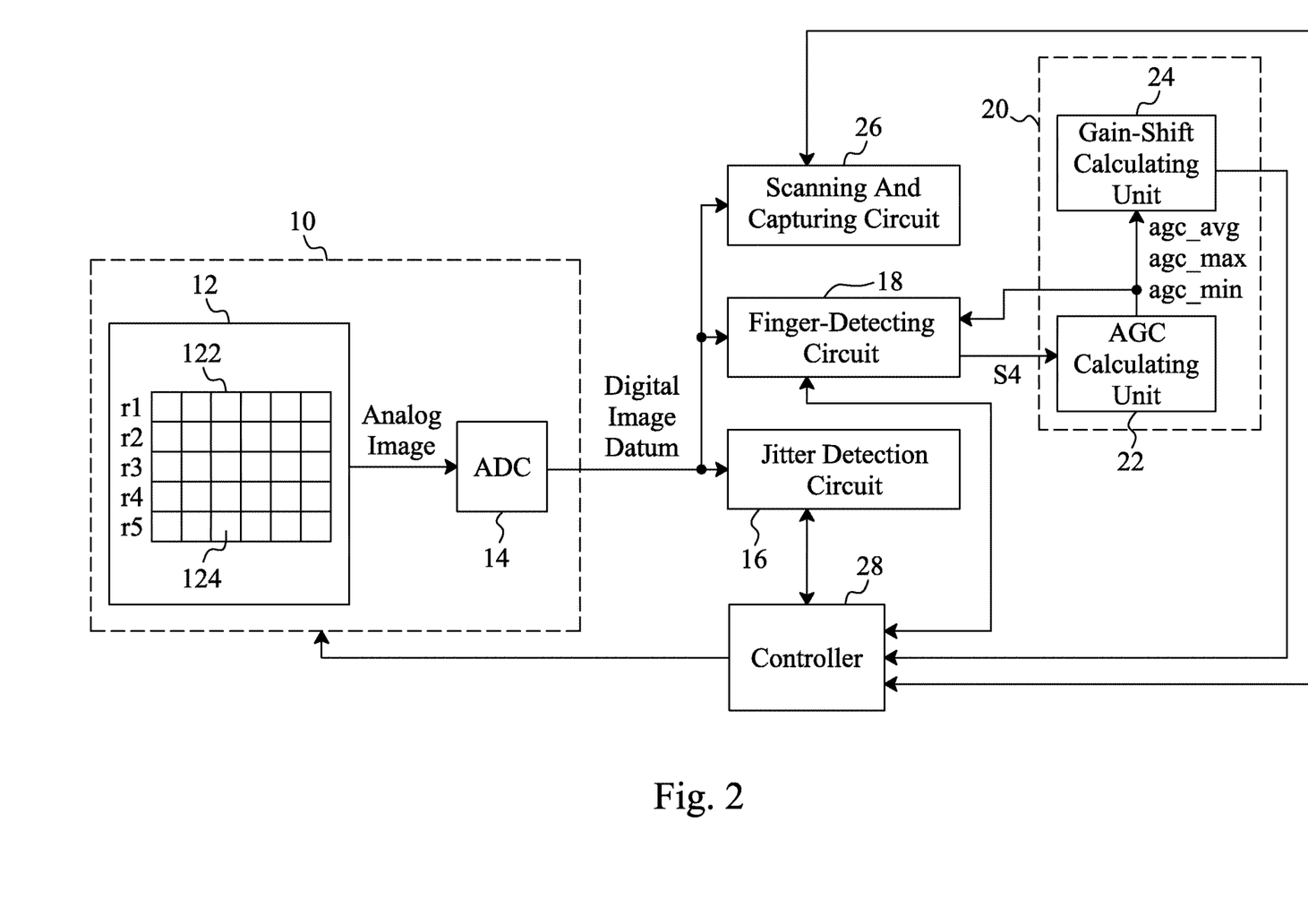
FIG. 2 is a block diagram of a circuit for fingerprint detection in one embodiment according to the present invention.
Figure 3:
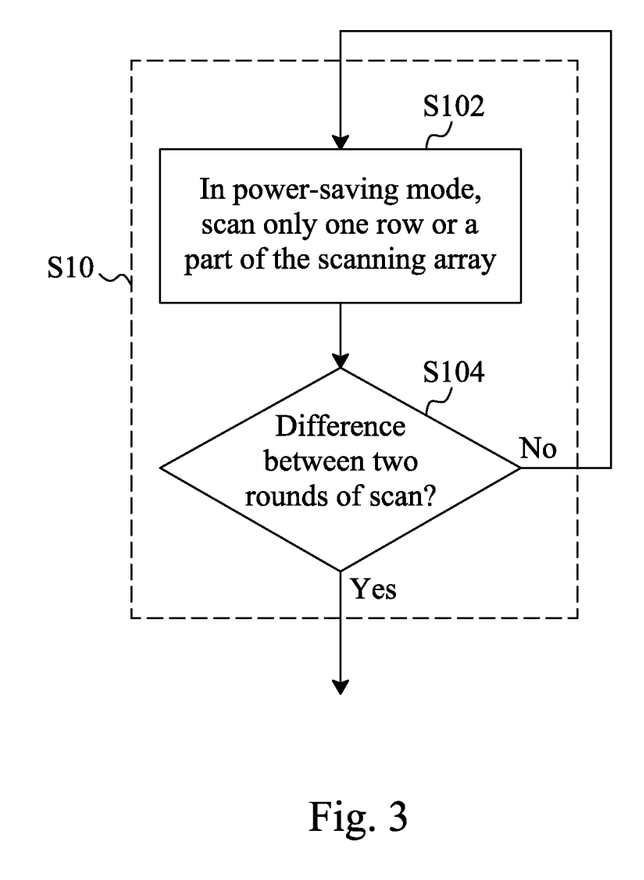
FIG. 3 is a flow chart of an embodiment for Step S10 shown in FIG. 1.

FIG. 1 depicts a method for fingerprint detection in a first embodiment according to the present invention, and FIG. 2 shows a circuit for fingerprint detection in one embodiment according to the present invention. In the circuit of FIG. 2, a fingerprint image generator 10 comprises a sensing circuit 12 and an analog-to-digital converter (ADC) 14. The sensing circuit 12 comprises a scanning array 122 composed of a plurality of sensing units 124. The sensing circuit 12 drives the scanning array 122 to generate an analog image. The ADC 14 converts the analog image into digital image datum. A jitter detection circuit 16 will identify whether the sensing circuit 12 is touched by an object according to the image datum output by the sensing circuit 12, as shown in Step S10 of FIG. 1. There are many ways to identify if a touch from an object is positive. For example, the jitter detection circuit 16 may compare two images output by the sensing circuit 12 in two rounds of scan, to detect any touch on the sensing circuit 12. FIG. 3 provides an embodiment of Step S10 shown in FIG. 1. To reduce power consumption, the controller 28 shown in FIG. 2 may signal the sensing circuit 12 into a power-saving mode during no object touching the sensing circuit 12, for example by having the sensing circuit 12 to scan only one row or a part of the scanning array 122 in a frame of image, as indicated by Step S102 of FIG. 3. Then, as indicated by Step S104, the two images obtained successively in two rounds (frames) of scan are compared to each other to identify any difference therebetween. If no difference is detected, it means there is no object touching the sensing circuit 12, and the process returns to Step S102. Otherwise, responsive to the difference detected, which means the sensing circuit 12 is touched by an object, the process goes to Step S12. Preferably, in Step S102 of FIG. 3, the row in the scanning array selected to be scanned is the central row (r3). In addition, the image datum obtained during the present round of scan is registered, and after the image datum of the next scan is obtained, Step S104 may compare the two images obtained from the two rounds of scan respectively to check whether there is difference between them. The time interval between the two rounds of scan may be set freely, for example one second.

After confirming an object's touch, the jitter detection circuit 16 sends a signal to the controller 28 for activating the finger-detecting circuit 18 to recognize whether the object is a finger. In the power-saving mode, at the time the controller 28 activates the finger-detecting circuit 18, it also sends a signal to the fingerprint image generator 10 to enter the sensing circuit 12 from the power-saving mode to a detection mode. In the detection mode, the controller 28 may control the sensing circuit 12 to scan any rows as required, so as to obtain analog images. The controller 28 may also control the ADC 14 to read data in different zones of the analog image to generate digital image datum as required. After being activated, the finger-detecting circuit 18 performs Step S12 to obtain the digital image datum from the fingerprint image generator 10. Then in Step S14, a preset first parameter is used to perform a first round of edge detection on the retrieved image to obtain a first value. Afterward, in Step S16, comparison is performed to see whether the first value satisfies a predetermined threshold. If the first value satisfies the predetermined threshold, it means that the object is a finger, and the finger-detecting circuit 18 sends a signal to the controller 28, so that the controller 28 activates a scanning and capturing circuit 26 to enter a scan mode, as shown in Step S22. The scanning and capturing circuit 26 after being activated starts to receive the digital image datum and perform fingerprint recognition. On the contrary, if the first value does not satisfy the predetermined threshold in Step S16, Step S18 is performed wherein a second parameter is used to perform the second round of edge detection on the same image already used.

Figure 4:
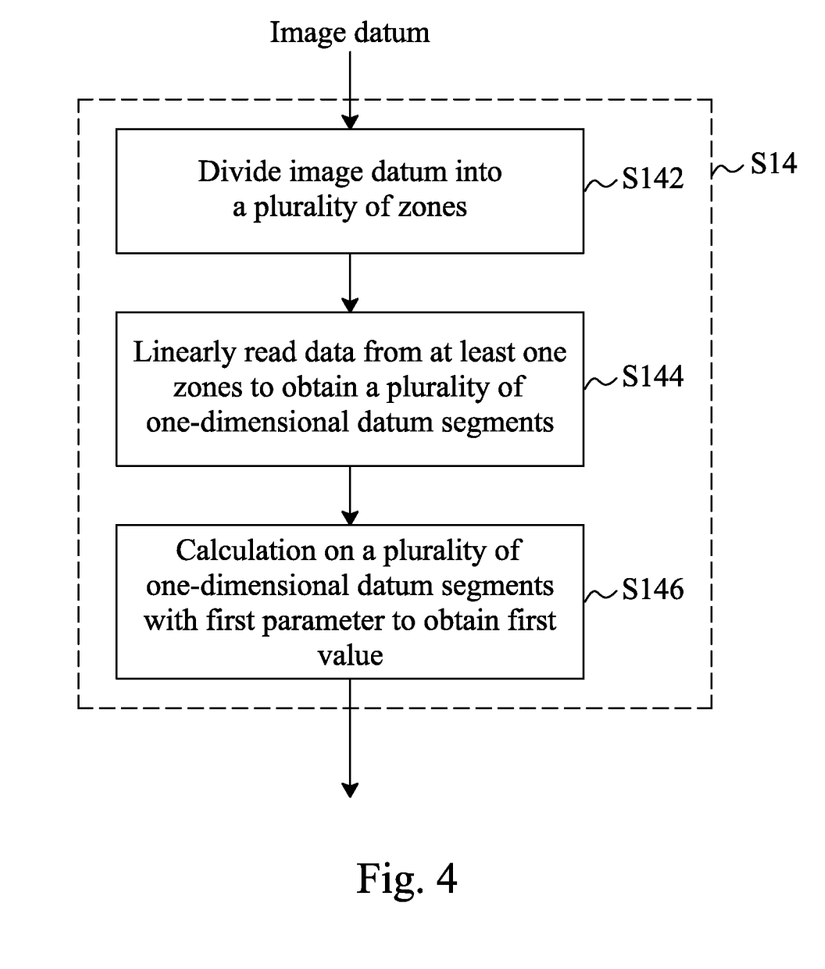
FIG. 4 is a flow chart of an embodiment for Step S14 shown in FIG. 1.
Figure 5:
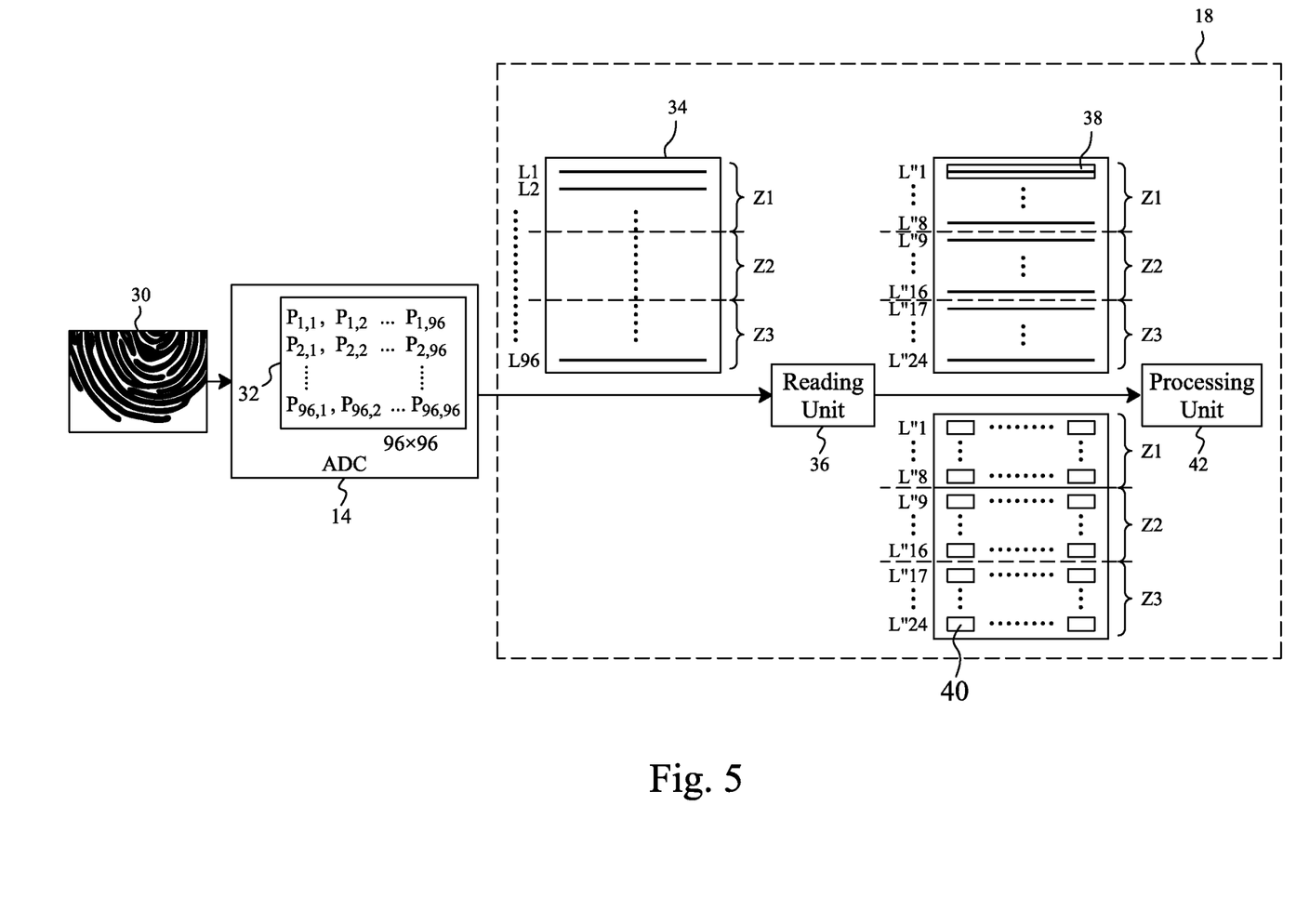
FIG. 5 is a block diagram of an embodiment for the finger-detecting circuit shown in FIG. 2.

FIG. 4 is an embodiment of Step S14 shown in FIG. 1, and FIG. 5 is an embodiment of the finger-detecting circuit 18 shown in FIG. 2. In FIG. 5, the ADC 14 converts the analog image 30 that it receives into two-dimensional digital datum 32 having N×N digits, for example 96×96 digits. Since the ADC 14 in mature sends data of the two-dimensional digital datum 32 converted from the analog image 30 in order, the two-dimensional digital datum 32 is output in rows, thus generating digital image datum 34 having 96 rows of data L1, L2 . . . L96. Each said row of data L1, L2 . . . L96 comprises 96 one-dimensional values. In Step S142 of FIG. 4, the digital image datum 34 is divided into a plurality of zones Z1, Z2, and Z3. The reading unit 36 of the finger-detecting circuit 18 is connected to the ADC 14, and linearly reads at least one part of the zones Z1, Z2 and Z3 so as to obtain a plurality of one-dimensional datum segments 38 and 40, as shown in Step S144. Each said one-dimensional datum segment 38 or 40 comprises a plurality of one-dimensional values. In the embodiment of FIG. 5, each of the zones Z1, Z2, and Z3 comprises 32 rows of data, and the reading unit 36 reads partially the zones Z1, Z2 and Z3, for example reading one row every 4 rows, and generates one-dimensional datum segments. In reading, the 96 one-dimensional values of a row datum may be read at once to form a one-dimensional datum segment 38. Alternatively, they are read in several groups to form a plurality of one-dimensional datum segments 40. For example, reading is performed for every 8 one-dimensional values to form a one-dimensional datum segment 40. In other embodiments, the reading unit 36 may alternatively read the row datum from only one zone. In addition, the reading pattern is not limited to reading one row every 4 rows, and may by reading one row every 8 rows, every 2 rows or any successive rows. A processing unit 42 connected to the reading unit 36 uses a first parameter to perform calculation on the one-dimensional datum segment 38 or 40 to obtain a first value, as shown in Step S146. In this embodiment, the digital image datum 34 is divided into upper, middle and lower zones. However, the present invention is not limited to the foregoing division, and other dividing schemes may be applicable, for example two-zone division, including a right zone and a left zone.

Figure 6:
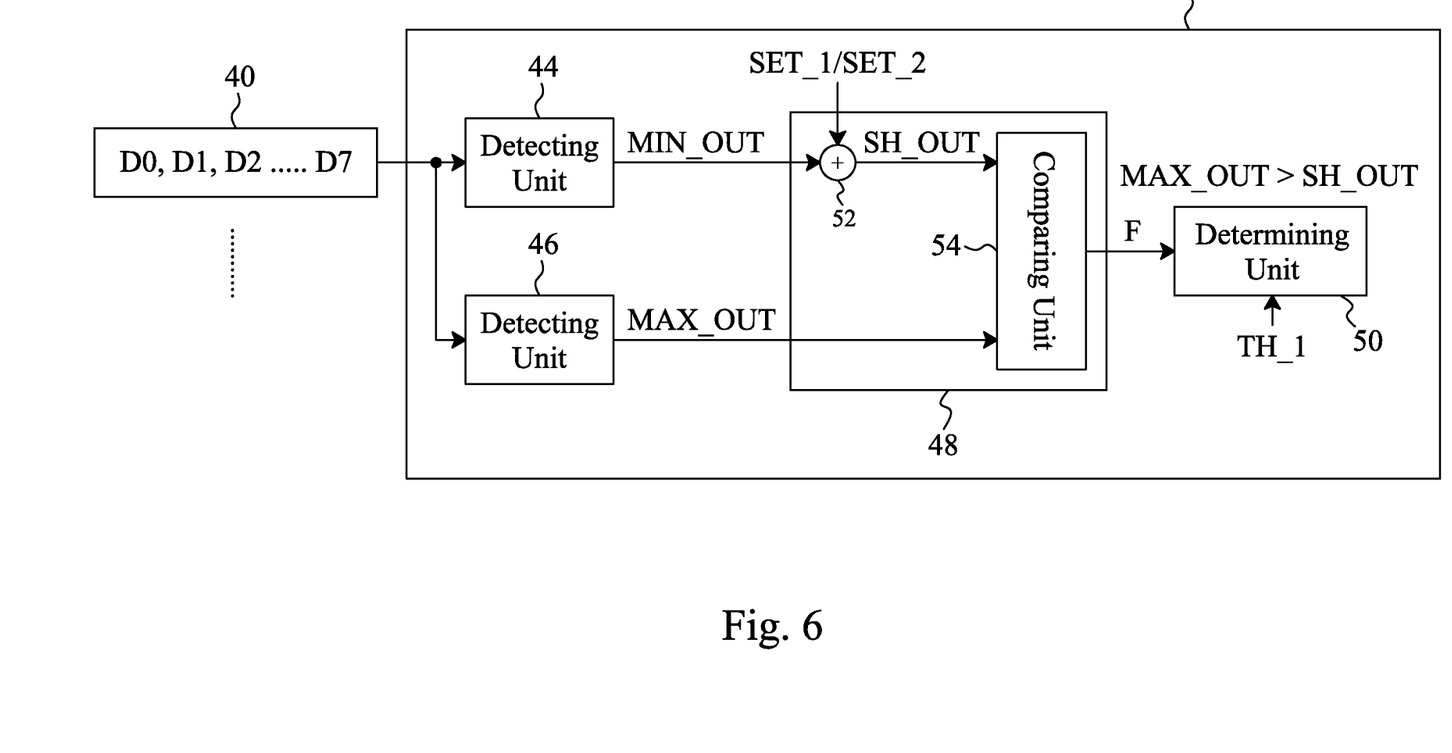
FIG. 6 is a block diagram of an embodiment for the processing unit shown in FIG. 5.

FIG. 6 is an embodiment of the processing unit 42 shown in FIG. 5, which comprises detecting units 44 and 46, a flagging unit 48, and a determining unit 50. After the reading unit 36 generates the one-dimensional digital datum segments 40, Step S146 of FIG. 4 is performed. At this time, the reading unit 36 provides these one-dimensional datum segments 40 to the processing unit 42 successively. The processing unit 42 identifies whether the detected object is a finger according to the one-dimensional datum segments 40. Since the image generated by a finger has a fingerprint edge, and there is an apparent grey-level difference at the fingerprint edge, it is possible to learn the proportion or number of the one-dimensional datum segments having fingerprint edges in the one-dimensional datum segments 40 by checking whether there is any grey-level differences existing in the one-dimensional datum segments 40, and to in turn recognize whether the object is a finger. When the one-dimensional datum segment 40 comprising one-dimensional values D0, D1, D2 . . . D7 is provided to the processing unit 42, the processing unit 42 has its detecting unit 44 select the minimum representative value MIN_OUT from the one-dimensional values D0, D1, D2 . . . D7, and has its detecting unit 46 select the maximum representative value MAX_OUT from the one-dimensional values D0, D1, D2 . . . D7. In this embodiment, the minimum among the one-dimensional values D0, D1, D2 . . . D7 is selected as the minimum representative value MIN_OUT, and the second largest one among the one-dimensional values D0, D1, D2 . . . D7 is selected as the maximum representative value MAX_OUT. For example, assuming that the one-dimensional values D0, D1, D2, D3, D4, D5, D6 and D7 are 0, 70, 200, 150, 120, 60 and 40, respectively, the minimum representative value MIN_OUT is 0, and the maximum representative value MAX_OUT is 150. Since the maximum one among the one-dimensional values D0, D1, D2 . . . D7 may be noise, the second largest one among the one-dimensional values is selected as the maximum representative value MAX_OUT, so as to avoid interference from noise. In other embodiments, the minimum representative value MIN_OUT and the maximum representative value MAX_OUT may be selected according to practical needs. The flagging unit 48 connected to the detecting units 44 and 46 compares the minimum representative value MIN_OUT and the maximum representative value MAX_OUT, so as to determine whether the one-dimensional datum segment 40 has a fingerprint edge. In the event that the one-dimensional datum segment 40 has a fingerprint edge, the flagging unit 48 generates a flag F. For example, where the difference between the maximum representative value MAX_OUT and the minimum representative value MIN_OUT is greater than the first parameter SET_1, it is clear that the one-dimensional datum segment has a significant grey-level difference, or we can say that the one-dimensional datum segment 40 has a fingerprint edge, so the flagging unit 48 generates a flag F. On the contrary, where the difference between the maximum representative value MAX_OUT and the minimum representative value MIN_OUT is not greater than the first parameter SET_1, the one-dimensional datum segment 40 does not have a significant grey-level difference, or we can say that the one-dimensional datum segment 40 does not have a fingerprint edge, so the flagging unit 48 does not issue a flag F. For example, when the minimum representative value MIN_OUT and maximum representative value MAX_OUT in the one-dimensional datum segment 40 are 0 and 150, respectively, the difference between the maximum representative value MAX_OUT and the minimum representative value MIN_OUT is 150. If the first parameter SET_1 is 100, the difference is greater than the first parameter SET_1, so the flagging unit 48 generates a flag F. If the first parameter SET_1 is 160, the difference is not greater than the first parameter SET_1, so the flagging unit 48 does not generate a flag F. In this embodiment, the flagging unit 48 comprises a shifting unit 52 and a comparing unit 54. The shifting unit 52 is connected to the detecting unit 44, and shifts the minimum representative value MIN_OUT by the first parameter SET_1 so as to generate a shifting representative value SH_OUT. The comparing unit 54 is connected to the shifting unit 52 and the detecting unit 46. It compares the shifting representative value SH_OUT and the maximum representative value MAX_OUT. When the maximum representative value MAX_OUT is greater than the shifting representative value SH_OUT, a flag F is generated. Upon completion of calculation on the present one-dimensional datum segment 40, the detecting units 44 and 46 and the flagging unit 48 perform calculation similarly on the next one-dimensional datum segment 40, until all the one-dimensional datum segments 40 are processed. After calculation for all the one-dimensional datum segments is done, the determining unit 50 counts the number of the flags F to obtain a first value. For example, the ratio of the number of the flags F to the number of the one-dimensional datum segments 40 may be taken as the first value. After the first value is obtained, Step S16 of FIG. 1 is performed to determine whether the object is a finger. When the first value is greater than the predetermined threshold TH_1, it means the proportion of the one-dimensional datum segments 40 having a fingerprint edge in all of the one-dimensional datum segments 40 is greater than the predetermined threshold TH_1, so it is determined that the object is a finger. Therein, the predetermined threshold TH_1 may be set according to practical needs. For example, when there are 144 one-dimensional datum segments 40 in total and there are 45 generated flags, the first value is 45/144=31.25%. Assuming that the predetermined threshold TH_1 is set as 30%, the first value is greater than the predetermined threshold TH_1, and it is determined that the object is a finger, and then Step S22 is performed. If the predetermined threshold TH_1 is set as 35%, the first value is not greater than the predetermined threshold TH_1, so Step S18 is performed to use the second parameter to perform the second round of edge detection.

In Step S18 of FIG. 1, the process and circuit for the second round of edge detection are the same as those for the first round of edge detection. Please refer to FIG. 4 through FIG. 6. The only difference is that in the second round of edge detection the second parameter SET_2 is used instead of the first parameter SET_1 for calculation, so as to generate the second value. After the second value is obtained, Step S20 is performed to compare the generated second value and the predetermined threshold TH_1. If the second value satisfies the predetermined threshold TH_1 (meaning that the second value is greater than the predetermined threshold TH_1), the detected object is determined as a finger and Step S22 is performed. If the second value does not satisfy predetermined threshold TH_1 (meaning that the second value is smaller than the predetermined threshold TH_1), the method proceeds with Step S24 to determine that the detected object is not a finger.

There are many ways to design the second parameter SET_2. Preferably, the second parameter SET_2 is determined according to the figure obtained during the first round of edge detection. Referring to FIG. 2, during the first round of edge detection, the finger-detecting circuit 18 provides the figure S4 as a result of calculation to the automatic gain control (AGC) circuit 20. The figure S4 comprises the minimum representative value MIN_OUT and the maximum representative value MAX_OUT of each said one-dimensional datum segment 38 or 40. The AGC calculating unit 22 of the AGC circuit 20 analyzes the figure S4 to obtain an average agc_avg, a maximum agc_max and a minimum agc_min. The finger-detecting circuit 18 determines the second parameter SET_2 according to the average agc_avg, the maximum agc_max, and the minimum agc_min generated by the AGC calculating unit 22. For example, the first parameter SET_1 is scaled up or down according to the three values so as to generate the second parameter SET_2. The gain-shift calculating unit 24 of the AGC circuit 20 also uses the average agc_avg, the maximum agc_max and the minimum agc_min generated by the AGC calculating unit 22 to determine a signal that is sent to the controller 28 for controlling the gain of the ADC 14. The gain-shift calculating unit 24 may adjust the gain of the ADC 14 every time the ADC 14 reads an analog image. Alternatively, it may adjust the gain of the ADC 14 only after the ADC 14 reads several analog images continuously. The AGC circuit 20 is known in the art and details about its circuit and operation are not described herein.

There are many ways to achieve edge detection. The method and circuit for one-dimensional calculation as shown in FIG. 4, FIG. 5 and FIG. 6 are only examples. The present invention may alternatively be realized using other methods for edge detection. For example, a traditional method for edge detection involving performing two-dimensional calculation on the two-dimensional datum 32 is usable. There are many ways to achieve finger detection, and edge detection is only exemplificative.

The present invention may use other method to detect whether there is a finger, such as analyzing the histogram of the central area of the whole image, meaning to perform statistical computing on distribution of data of the ADC 14 according to the values agc_max, agc_min, and agc_avg. Assuming that there are totally 100 points, if the number of white points is less than 40 or the number of black points is more than 30, it is determined that there is a finger. By doing this, any fingerprints remaining from the previous detection can be filtered out.

In FIG. 2, the controller 28 may control the ADC 14 to read data of different zones according to the analysis of fingerprint detection. For example, where the fingerprint is too weak, it requires reading 8 rows of data, or adjusts the gain of the ADC 14 according to the calculation of the AGC circuit 20, or it requires the ADC circuit 14 to send out the whole image according to the state of fingerprint scan.

Figure 7:
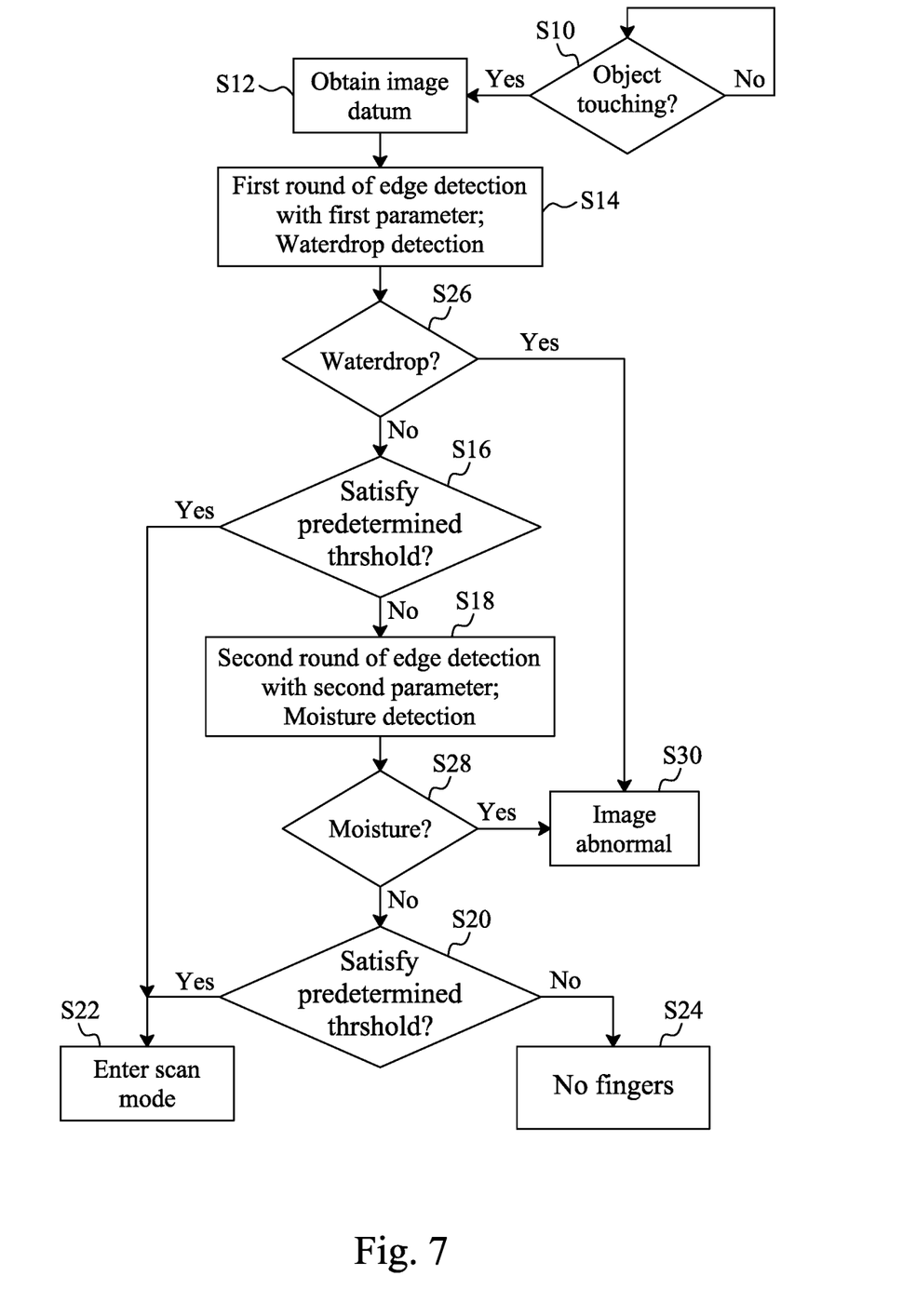
FIG. 7 is a flow chart of a method for fingerprint detection in an embodiment according to the present invention to show waterdrop and moisture detection is applied.

There are some other methods for fingerprint detection capable of recognizing abnormal images, such as detection for waterdrop, for moisture, and for symmetry, and these methods are all usable to implement the present invention. FIG. 7 shows an embodiment of the present invention that uses detection for waterdrop and for moisture. The embodiment shown in FIG. 7 is similar to its counterpart depicted in FIG. 1, with the difference laying on that while the finger-detecting circuit 18 performs the first and second rounds of edge detection in Step S14 and Step S18, respectively, it also performs detection for waterdrop and for steam detection. In Step S14 of FIG. 7, a first round of edge detection and detection for waterdrop are finished, and afterward Step S26 is performed to first determine whether any waterdrops are detection. If yes, Step S30 is performed to determine that the image is abnormal and the current task is ended. If not, Step S16 is performed to determine whether the first value generated during the first round of edge detection satisfies the predetermined threshold. Similarly, in Step S18 of FIG. 7, a second round of edge detection and detection for moisture are finished, and afterward Step S28 is performed first to determine whether there is moisture. If yes, the image is determined as being abnormal and the current task is ended. If not, Step S20 is performed to determine whether the second value generated during the second round of edge detection satisfies the predetermined threshold. In other embodiments, detection for waterdrop may be performed during the second round of edge detection, or performed for each of the first round of and the second round of edge detection. The foregoing detection for waterdrop and for moisture is known in the art and operation thereof is not to be described in any detail herein.

What is claimed is:

1. A method for fingerprint detection, comprising the steps of:
    after a touch from an object is confirmed, using a first parameter to perform a first round of edge detection on an image datum output by a fingerprint image generator, so as to determine whether the object is a finger, wherein the fingerprint image generator comprises a scanning array for scanning the object;
    when a first value obtained during the first round of edge detection does not satisfy a predetermined threshold, using a second parameter to perform a second round of edge detection on the image datum; and
    when a second value obtained during the second round of edge detection does not satisfy the predetermined threshold, determining that the object is not a finger.

2. The method of claim 1, further comprising only using one row of the scanning array to scan, so as to determine whether the object's touch exists.

3. The method of claim 1, further comprising the steps of:
    performing the two rounds of scan using only one row of the scanning array; and
    comparing results from the two rounds of scan, so as to determine whether the object's touch exists.

4. The method of claim 1, further comprising only using a central row of the scanning array to scan, so as to determine whether the object's touch exists.

5. The method of claim 1, further comprising performing automatic gain control calculation after the first round of edge detection according to a figure obtained during the first round of edge detection, so as to obtain a maximum, a minimum and an average and determine the second parameter accordingly.

6. The method of claim 1, further comprising performing detection for waterdrop on the image datum, so as to determine whether the image datum is abnormal.

7. The method of claim 1, further comprising performing detection for moisture on the image datum, so as to determine whether the image datum is abnormal.

8. The method of claim 1, wherein the first round of edge detection comprises the steps of:
    dividing the image datum into a plurality of zones;
    reading part of the datum of at least one of the zones linearly, so as to obtain a plurality of one-dimensional datum segments, wherein each said one-dimensional datum segment comprises a plurality of one-dimensional values; and
    using the first parameter to perform calculation on the one-dimensional datum segments, so as to generate the first value.

9. The method of claim 8, wherein the step of generating the first value comprises the steps of:
    A.) selecting a minimum representative value and a maximum representative value among the one-dimensional values of each said one-dimensional datum segment, and generating a flag when a difference between the maximum representative value and the minimum representative value is greater than the first parameter; and
    B.) counting a number of the flags generated for the one-dimensional datum segments, so as to obtain the first value.

10. The method of claim 9, wherein said step A comprises selecting a minimum among the one-dimensional values.

11. The method of claim 9, wherein said step A comprises selecting a second largest one among the one-dimensional values.

12. The method of claim 1, wherein the second round of edge detection comprises the steps of:
    dividing the image datum into a plurality of zones;
    reading part of the datum of at least one of the zones linearly, so as to obtain a plurality of one-dimensional datum segments, wherein each said one-dimensional datum segment comprises a plurality of one-dimensional values; and
    using the second parameter to perform calculation on the one-dimensional datum segments so as to generate the second value.

13. The method of claim 12, wherein the step of generating the second value comprises the steps of:
    A.) selecting a minimum representative value and a maximum representative value from the one-dimensional values of each said one-dimensional datum segment, and generating a flag when a difference between the maximum representative value and the minimum representative value is greater than the second parameter; and
    B.) counting a number of the flags generated for the one-dimensional datum segments, so as to obtain the second value.

14. The method of claim 13, wherein said step A comprises selecting a minimum among the one-dimensional values.

15. The method of claim 13, wherein said step A comprises selecting a second largest one among the one-dimensional values.

16. A circuit for fingerprint detection, comprising:
    a fingerprint image generator, outputting an image datum that represents an object; and a finger-detecting circuit, being connected to the fingerprint image generator, using a first parameter to perform a first round of edge detection on the image datum, and using a second parameter to perform a second round of edge detection on the image datum when a first value obtained during the first round of edge detection does not satisfy a predetermined threshold, wherein when a second value obtained during the second round of edge detection does not satisfy the predetermined threshold, the finger-detecting circuit determines that the object is not a finger.

17. The circuit of claim 16, wherein the fingerprint image generator comprises:
   a sensing circuit, comprising a scanning array composed of a plurality of sensing units, and driving the scanning array to generate an analog image; and
   an analog-to-digital converter, being connected to the sensing circuit, and converting the analog image into the image datum.

18. The circuit of claim 17, wherein the sensing circuit in a power-saving mode only uses one row of the scanning array to scan.

19. The circuit of claim 18, wherein the sensing circuit in the power-saving mode only uses a central row of the scanning array to scan.

20. The circuit of claim 16, further comprising a jitter detection circuit that is connected to the fingerprint image generator, and determines whether the object's touch exists according to the two successive image data.

21. The circuit of claim 16, further comprising an automatic gain control circuit that is connected to the finger-detecting circuit, and obtains a maximum, a minimum and an average according to a figure generated by the finger-detecting circuit during the first round of edge detection so as to determine the second parameter.

22. The circuit of claim 16, wherein the finger-detecting circuit further performs detection for waterdrop or detection for moisture.

23. The circuit of claim 16, wherein the finger-detecting circuit comprises:
   a reading unit, being connected to the fingerprint image generator, and generating a plurality of one-dimensional datum segments linearly according to the image datum, wherein each said one-dimensional datum segment comprises a plurality of one-dimensional values; and
   a processing unit, being connected to the reading unit, and determining whether the object is a finger according to the one-dimensional datum segments.

24. The circuit of claim 23, wherein the processing unit comprises:
   a first detecting unit, being connected to the reading unit, and selecting a minimum representative value from the one-dimensional values of the received one-dimensional datum segment;
   a second detecting unit, being connected to the reading unit, and selecting a maximum representative value from the one-dimensional values of the received one-dimensional datum segment;
   a flagging unit, being connected to the first detecting unit and the second detecting unit, comparing the maximum representative value and the minimum representative value, and generating a flag when a difference between the maximum representative value and the minimum representative value is greater than the first parameter or the second parameter; and
   a determining unit, being connected to the flagging unit, counting a number of the flags generated in the one-dimensional datum segments, so as to obtain the first value or the second value, and determining that the object is a finger when the first value or the second value is greater than the predetermined threshold.

25. The circuit of claim 24, wherein the minimum representative value comprises a minimum among the one-dimensional values.

26. The circuit of claim 24, wherein the maximum representative value comprises a second largest one among the one-dimensional values.

27. The circuit of claim 24, wherein the flagging unit comprises:
   a shifting unit, being connected to the first detecting unit, and shifting the minimum representative value according to the first parameter so as to generate a shifting representative value; and
   a comparing unit, being connected to the shifting unit and the second detecting unit, comparing the shifting representative value and the maximum representative value, and generating the flag when the maximum representative value is greater than the shifting representative value.

* * * * *